United States Patent
Hüger et al.

(10) Patent No.: US 11,987,262 B2
(45) Date of Patent: May 21, 2024

(54) METHOD AND DEVICE FOR THE AUTOMATED DRIVING OF A VEHICLE

(71) Applicant: Volkswagen Aktiengesellschaft, Wolfsburg (DE)

(72) Inventors: Fabian Hüger, Wolfenbüttel (DE); Peter Schlicht, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 347 days.

(21) Appl. No.: 17/270,324

(22) PCT Filed: Jul. 4, 2019

(86) PCT No.: PCT/EP2019/067988
§ 371 (c)(1),
(2) Date: Feb. 22, 2021

(87) PCT Pub. No.: WO2020/043369
PCT Pub. Date: Mar. 5, 2020

(65) Prior Publication Data
US 2021/0245781 A1  Aug. 12, 2021

(30) Foreign Application Priority Data
Aug. 27, 2018 (DE) ..................... 10 2018 214 419.2

(51) Int. Cl.
*B60W 60/00* (2020.01)
*B60W 50/06* (2006.01)

(52) U.S. Cl.
CPC .......... *B60W 60/001* (2020.02); *B60W 50/06* (2013.01); *B60W 2556/45* (2020.02)

(58) Field of Classification Search
CPC ............... B60W 60/001; B60W 50/06; B60W 2556/45; B60W 2050/0062;
(Continued)

(56) References Cited

U.S. PATENT DOCUMENTS 7,321,818 B2  1/2008 Michi et al. .................... 701/96
9,630,616 B2  4/2017 Reichel et al.
(Continued)

FOREIGN PATENT DOCUMENTS

CN  108137041 A  6/2018
CN  108139756 A  6/2018
(Continued)

OTHER PUBLICATIONS

Hauler et al., WO2016020091A1_Machine Translation, 2016 (Year: 2016).*
(Continued)

*Primary Examiner* — Jelani A Smith
*Assistant Examiner* — Alyssa Rorie
(74) *Attorney, Agent, or Firm* — Slayden Grubert Beard PLLC (57) ABSTRACT

A method for automated driving of a vehicle, comprising: provide function modules, wherein the function modules each comprise at least one subfunction for automated driving, and wherein the function modules are each assigned at least one module validity attribute that defines the context of the surroundings in which the particular function module is valid, provide at least one system configuration, wherein the at least one system configuration comprises at least one of the function modules, and wherein the at least one system configuration is assigned at least one configuration validity attribute that defines the context of the surroundings in which the at least one system configuration is valid, select one of the at least one system configurations, wherein the selection depends on a context of the surroundings and the at least one associated configuration validity attribute, control the vehicle, wherein controlling is based on the selected system configuration.

12 Claims, 3 Drawing Sheets

(58) Field of Classification Search
CPC ......... B60W 2555/20; B60W 2556/55; B60W 50/0205; B60W 50/0225; B60W 50/029; B60W 2050/0088; B60W 50/0098; B60W 2050/0095

See application file for complete search history.

(56) References Cited

U.S. PATENT DOCUMENTS

| | | | |
|---|---|---|---|
| 9,933,781 B1 | 4/2018 | Bando et al. | |
| 10,065,647 B2* | 9/2018 | Tiwari | G08G 1/0129 |
| 10,955,842 B2* | 3/2021 | Zeng | B60W 10/18 |
| 2011/0071701 A1 | 3/2011 | Holub et al. | 701/2 |
| 2015/0266488 A1 | 9/2015 | Solyom et al. | 701/28 |
| 2017/0313324 A1* | 11/2017 | Kumai | B60W 40/02 |
| 2018/0059672 A1 | 3/2018 | Li et al. | |
| 2018/0127001 A1* | 5/2018 | Ricci | B60W 50/14 |
| 2018/0237006 A1 | 8/2018 | Ishii et al. | |
| 2018/0246522 A1 | 8/2018 | Max et al. | |
| 2019/0375408 A1* | 12/2019 | Ruenz | B60W 30/18 |
| 2019/0377341 A1* | 12/2019 | Choi | B60W 30/182 |
| 2020/0012280 A1* | 1/2020 | Lin | G01C 21/3848 |
| 2020/0139988 A1* | 5/2020 | Kanekawa | G05B 9/02 |
| 2020/0168094 A1* | 5/2020 | Shimodaira | G06N 20/00 |
| 2021/0024097 A1* | 1/2021 | Jardine | B60W 50/082 |
| 2021/0026550 A1* | 1/2021 | Nakano | G06F 3/0644 |
| 2021/0237664 A1* | 8/2021 | Gut | B60R 16/023 |

FOREIGN PATENT DOCUMENTS

| | | | | |
|---|---|---|---|---|
| DE | 19821163 | A1 | 11/1999 | |
| DE | 10210547 | A1 | 9/2003 | |
| DE | 102004009308 | A1 | 9/2005 | |
| DE | 102006058104 | A1 | 6/2008 | |
| DE | 102010037467 | A1 | 3/2011 | |
| DE | 102010063792 | A1 | 6/2012 | |
| DE | 102011005844 | A1 | 9/2012 | |
| DE | 102016225772 | A1 | 6/2018 | |
| DE | 102018214419 | A1 | 2/2020 | |
| EP | 2888142 | B1 | 6/2016 | |
| WO | WO-2016020091 | A1 * | 2/2016 | ......... B60W 30/182 |
| WO | 2017/006015 | A1 | 1/2017 | |
| WO | 2020/043369 | A1 | 3/2020 | |

OTHER PUBLICATIONS

International Search Report and Written Opinion, Application No. PCT/EP2019/067988, 20 pages.

* cited by examiner

METHOD AND DEVICE FOR THE AUTOMATED DRIVING OF A VEHICLE

CROSS-REFERENCE TO RELATED APPLICATIONS

This application claims priority to German Patent Application No. 10 2018 214 419.2, filed on Aug. 27, 2018 with the German Patent and Trademark Office. The contents of the aforesaid Patent Application are incorporated herein for all purposes.

TECHNICAL FIELD

The invention relates to a method and a device for the automated driving of a vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern vehicles, in particular motor vehicles, are equipped with numerous assistance systems that support the driver in driving the vehicle. Furthermore, there are already vehicles that can be automatically driven. To accomplish this, longitudinal and transverse guidance of a control system can be automatically controlled.

Given the many surrounding situations in which the vehicle can move, automated driving is a highly complex problem. The complexity has resulted in a situation in which there is no general solution for automated driving, but rather numerous individual solutions that each address certain situations, or respectively surroundings of the vehicle. For example, the functions of automated driving can be restricted to certain geographic regions, such as those that are mapped with a high detail resolution. Furthermore, it is known to use differently designed control systems for different situations, for example in the form of park assists that can automatically park in a parking space, or following assists that can automatically follow a proceeding car on highways. It is also known to only provide the function of automated driving when certain conditions in the surroundings of the vehicle are met, for example only when a sufficient visibility range is available.

SUMMARY

An object exists to provide a method and device for the automated driving of a vehicle in which automated driving can be performed better, in particular more flexibly with respect to different surrounding situations.

The object is solved by the subject matter of the independent claims. Embodiments of the invention are discussed in the dependent claims and the following description.

The details of one or more embodiments are set forth in the accompanying drawings and the description below. Other features will be apparent from the description, drawings, and from the claims.

DESCRIPTION

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first exemplary aspect, a method for automatically driving a vehicle is made available, which comprises the following steps in a control system: provide function modules, wherein the function modules each comprise at least one subfunction for automated driving, and wherein the function modules are each assigned at least one module validity attribute that defines the context of the surroundings in which the particular function module is valid; provide at least one system configuration, wherein the at least one system configuration comprises at least one of the function modules, and wherein the at least one system configuration is assigned at least one configuration validity attribute that defines the context of the surroundings in which the at least one system configuration is valid;

select one of the at least one system configurations, wherein the selection depends on a context of the surroundings and the at least one assigned configuration validity attribute;

control the vehicle, wherein controlling is based on the selected system configuration.

Furthermore and in another exemplary aspect, a device is provided for the automated driving of a vehicle and comprises a control system, wherein the control system has a providing apparatus and selecting apparatus. The providing apparatus is designed to provide function modules, wherein the function modules each comprise at least one subfunction for automated driving, and wherein the function modules are each assigned at least one module validity attribute that defines the context of the surroundings in which the particular function module is valid. The providing apparatus is furthermore designed to provide at least one system configuration, wherein the at least one system configuration comprises at least one of the function modules, and wherein the at least one system configuration is assigned at least one configuration validity attribute that defines the context of the surroundings in which the at least one system configuration is valid. The selecting apparatus is designed to select one of the at least one system configurations, wherein the selection depends on a context of the surroundings and the at least one assigned configuration validity attribute. The control system is designed to automatically control the vehicle, wherein controlling is based on the selected system configuration.

A basic exemplary concept is to use system configurations that differ from each other for automated driving in different surrounding situations, or respectively contexts of the surroundings. The individual system configurations are composed of individual function modules. The function modules each comprise at least one subfunction for automated driving. Expressed otherwise, the function modules each form a step along a processing chain that is processed during automated driving. This processing chain comprises for example detecting surroundings of the vehicle, recognizing objects in the detected surroundings, mapping the surroundings, calculating a probability of the vehicle colliding with objects recognized in the surroundings, trajectory planning, and controlling, or respectively regulating longitudinal and transverse guidance of the vehicle. The following function modules are mentioned in this context as examples of detecting the surroundings: a function module for actuating a radar sensor and a function module for actuating a camera. A function module for recognizing objects in detected surroundings data can for example be object recognition based on graphic patterns in the detected camera data. A function module for mapping the surroundings can for example comprise providing a detailed map of the surroundings in global or relative coordinates. These function modules are each assigned at least one module validity attribute that defines the context of the surroundings in which the particular function module is valid. The "context of the surroundings" in this case means at least one property of vehicle surroundings, such as site information, traffic regulations and/or weather-dependent information, etc. that should be taken into account within the surroundings. The module validity attribute defines the range within which the associated function module is valid, i.e., the range, or respectively the surroundings within which it can be used, or respectively may be used. Accordingly for example, it can be provided that a function module cannot be used after dark for actuating a camera sensitive within the visual spectrum, i.e., an associated module validity attribute defines that the function module is invalid when it is dark, etc.

The at least one function module is for example saved in a memory with the associated at least one module validity attribute, for example in the providing apparatus. This may in particular be in the form of a database.

The function modules in this case may be designed logically, i.e., in particular as program code run on a microcontroller or microprocessor to solve a step in the processing chain for automated driving. In this case, it may be provided that the function modules access, or respectively control and configure hardware such as a sensor, an actuator system, and/or a communication interface of the vehicle.

Furthermore, it is provided that at least one system configuration is provided, wherein the at least one system configuration comprises at least one of the function modules. The at least one system configuration is assigned at least one configuration validity attribute that defines the context of the surroundings in which the least one system configuration is valid. The configuration validity attribute is in particular derivable, or respectively is derived from the module validity attributes of the function modules contained in the system configuration, in particular by forming an intersection of the individual validities expressed in the module validity attributes. A system configuration is a specific solution for automated driving of the vehicle within certain surroundings, or respectively a context of the surroundings.

The at least one system configuration is for example also saved in a memory, for example in the providing apparatus, with the associated at least one configuration validity attribute. In this case as well, a database may for example also be used.

The system configuration may be selected from the at least one system configuration(s), wherein the selection depends on a context of the surroundings and the at least one associated configuration validity attribute.

The vehicle may be controlled based on the selected system configuration. For automated driving within specific surroundings, function modules are therefore specifically selected from the provided function modules and combined into a system configuration. For these specific surroundings, the vehicle may be then controlled based on this system configuration.

To accomplish this, the control system may be configured corresponding to the selected system configuration, i.e., in particular the corresponding function modules may be activated. This may include both a pure software activation such as by activating program code, as well as a hardware activation, for example in that corresponding hardware components of the control system and possibly other components are activated, or respectively are correspondingly switched or interconnected physically.

The vehicle in some embodiments is controlled by providing a corresponding control signal for transverse and longitudinal guidance of the vehicle.

In some embodiments, it is provided that the system configuration includes the processing chain that must be run through during automated driving. This processing chain includes in particular detecting surroundings of the vehicle, object recognition within detected surroundings data, estimating a probability of collision of the vehicle with objects in the surroundings, planning trajectories for the vehicle, and regulating longitudinal and transverse guidance of the vehicle. The individual steps in this processing chain are each processed, or respectively solved by the individual function modules. Depending on the context of the surroundings, fewer or more function modules can be used in this case.

A context of the surroundings may for example be derived from surroundings detected by means of a sensor system. Alternatively or in addition, the context of the surroundings may also be derived in another way, for example by simulating it, or deriving or merging it from provided surroundings data such as weather data, current congestion data, etc.

The benefit of the device and the method is that the reaction to properties of surroundings, i.e., a context of the surroundings, may be more flexible. By providing individual system configurations, a solution tailored to these surroundings may be provided for all surroundings. Furthermore, the function modules that may be used to provide the system configuration may be flexibly expanded or adapted.

In some embodiments, the system configurations may be influenced, or respectively adapted by correspondingly selecting the individual function modules using the following means: specific program code, specific parameter sets, such as for overcoming redundancy or to interpret/evaluate uncertainties, etc., and different modules for data processing and data analysis.

The validity of the function modules, or respectively the system configurations expressed in the form of module validity attributes and the configuration validity attributes are to be understood as areas or the contexts of surroundings in which a particular function module, or respectively a particular system configuration may be used, i.e., in which they are valid. Such a validity results for example based on specific locations, for example countries, cities or local areas in cities or regions, or based on points of interest (POI) in surroundings of the vehicle. Moreover, a validity may also result depending on specific classes of contexts of the environment. Such contexts of the surroundings are for example highways, parking garages, traffic jams, and complex intersections with a specifically available Car2X infrastructure. Environmental conditions may also define the validity, such as the weather, the visibility conditions, the traffic, the geography, the road type or the time of day. Driving parameters are also possible such as a speed, a vehicle type, trip parameters or preferences by a driver of the vehicle. Finally, legal frameworks should also be mentioned that may influence validity, for example noise protection, emission limits or stipulated behavioral rules.

The validity expressed in a module validity attribute, or respectively a system validity attribute, may be expressed in the form of a binary code, i.e., the associated function module, or respectively the associated system configuration is either valid or it is not valid. For example, a function module that is associated with automated parking of the vehicle is invalid at a speed of 180 km/h on a highway. It may however also be provided that the validity expressed in a module validity attribute, or respectively a system validity attribute, is expressed in the form of a confidence value, wherein this confidence value is a measure of how effective the associated function module, or respectively the associated system configuration is within a specific context of the surroundings. Accordingly for example, the confidence value of a radar sensor at night can be higher than that of a camera. Furthermore, it may also be provided that the validity expressed in a module validity attribute, or respectively a system validity attribute is formulated as an exclusive validity, i.e., that the associated function module, or respectively the associated system configuration must necessarily be used, for example due to a legal or a technical requirement.

To provide the least one system configuration, some embodiments provide that at least one of the provided function modules is selected and assigned to this system configuration, wherein the selection depends on a context of the surroundings and the assigned module validity attributes of the function modules. In this manner, a system configuration may be tailored depending on a surroundings in that the function modules valid for the specific context of the surroundings are compiled. The selection and assignment may occur while planning automated driving, i.e., on the basis of anticipated surroundings, or respectively a context of the surroundings. If for example highway driving is planned in the context of automated driving, a corresponding system configuration may be compiled for this highway driving by selecting the suitable, or respectively valid function modules for the surroundings, or respectively the context of the surroundings of "highway". This system configuration is then assigned a configuration validity attribute. This can for example be done by forming an intersection of the validities, or respectively validity areas of the associated function modules expressed in the individual module validity attributes.

The device correspondingly provides that the control system comprises a configuration apparatus, wherein the configuration apparatus is designed to compile the at least one system configuration by selecting at least one of the provided function modules, wherein the selection depends on a context of the surroundings and the assigned module validity attributes of the function modules.

To provide the function modules, some embodiments provide that at least one function module is requested and/or is or was received from a vehicle-external database. The benefit of this is that function modules can be provided flexibly. For example, this makes it possible to continuously adapt function modules to changing legal requirements or conditions of the surroundings. This also enables the introduction, or respectively expansion of function modules, for example by manufacturers or suppliers of individual components of the vehicle. Accordingly, a manufacturer of a camera installed in the vehicle for detecting the surroundings may improve the associated function module for controlling the camera even after delivery, and may provide the improved function module through the database. The improved function module may then be requested from the vehicle-external database of the camera manufacturer and received therefrom. The same thing is possible for other function modules of the processing chain for automated driving. Other suppliers of function modules may for example be startups, municipalities or other state institutions, or respectively databases. For example, a city may provide certain function modules that are valid for the city, or for areas within the city, and cover particular circumstances in the city such as a particular route, a right-of-way for cyclists in bicycle lanes, or special traffic zones such as limited traffic zones in which a particularly large number of old people or children socialize. A function module for object recognition for canes, walkers or walking-aid bicycles can for example be provided in such zones to improve automated driving.

In the device, it is accordingly provided that, to provide the function modules, the providing apparatus is furthermore designed to request at least one function module from a vehicle-external database, and/or to receive it therefrom. For example, the providing apparatus can have a communication interface which is correspondingly designed therefor, that can communicate with the vehicle-external database.

In some embodiments, it is provided that, to provide the at least one system configuration, at least one system configuration is requested from a vehicle-external database and/or is or was received therefrom. The benefit of this is that entire system configurations can be downloaded from a database.

To provide the at least one system configuration, the device correspondingly provides that the providing apparatus is furthermore designed to request at least one system configuration from a vehicle-external database, and/or to receive it therefrom. For example, the providing apparatus may have a communication interface which is correspondingly designed therefor, that may communicate with the vehicle-external database.

To execute automated driving of the vehicle, some embodiments provide that a configuration for said driving is compiled, wherein the configuration plan is realized by selecting provided system configurations depending on contexts of the surroundings of automated driving and each of the configuration validity attributes assigned to the system configurations, and wherein the vehicle is controlled based on the compiled configuration plan. Completely automated driving may be planned and executed based on the compiled configuration plan. If for example long-distance driving is to be executed, such a configuration plan may include system configurations for the following surroundings, or respectively contexts of surroundings: leaving the garage at the starting location, entering the public side street, driving in city traffic, entering the highway, driving on the highway, leaving the highway, driving on the country road, leaving the country road, driving in a village, driving on a play street and parking at the target location. The appropriate system configuration is selected for each context of the surroundings and assigned to the configuration plan at the corresponding location. The assignment may occur in particular in a temporal sequence, a site-dependent sequence, and/or a sequence depending on the context of the surroundings. The particular system configuration in the configuration plan is then activated, or respectively deactivated depending on the time, location, and/or context of the surroundings.

The device correspondingly provides that the control system includes a planning apparatus, wherein to perform automated driving of the vehicle, the planning apparatus is designed to compile a configuration plan for said driving, wherein this is realized by selecting provided system configurations depending on a current and at least one future context of the surroundings of the automated driving and each of the configuration validity attributes assigned to the system configuration, and wherein the control system is furthermore designed to control the vehicle based on the compiled configuration plan.

In the following, the invention will be explained in greater detail based on further exemplary embodiments and with reference to the FIGS.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 1:
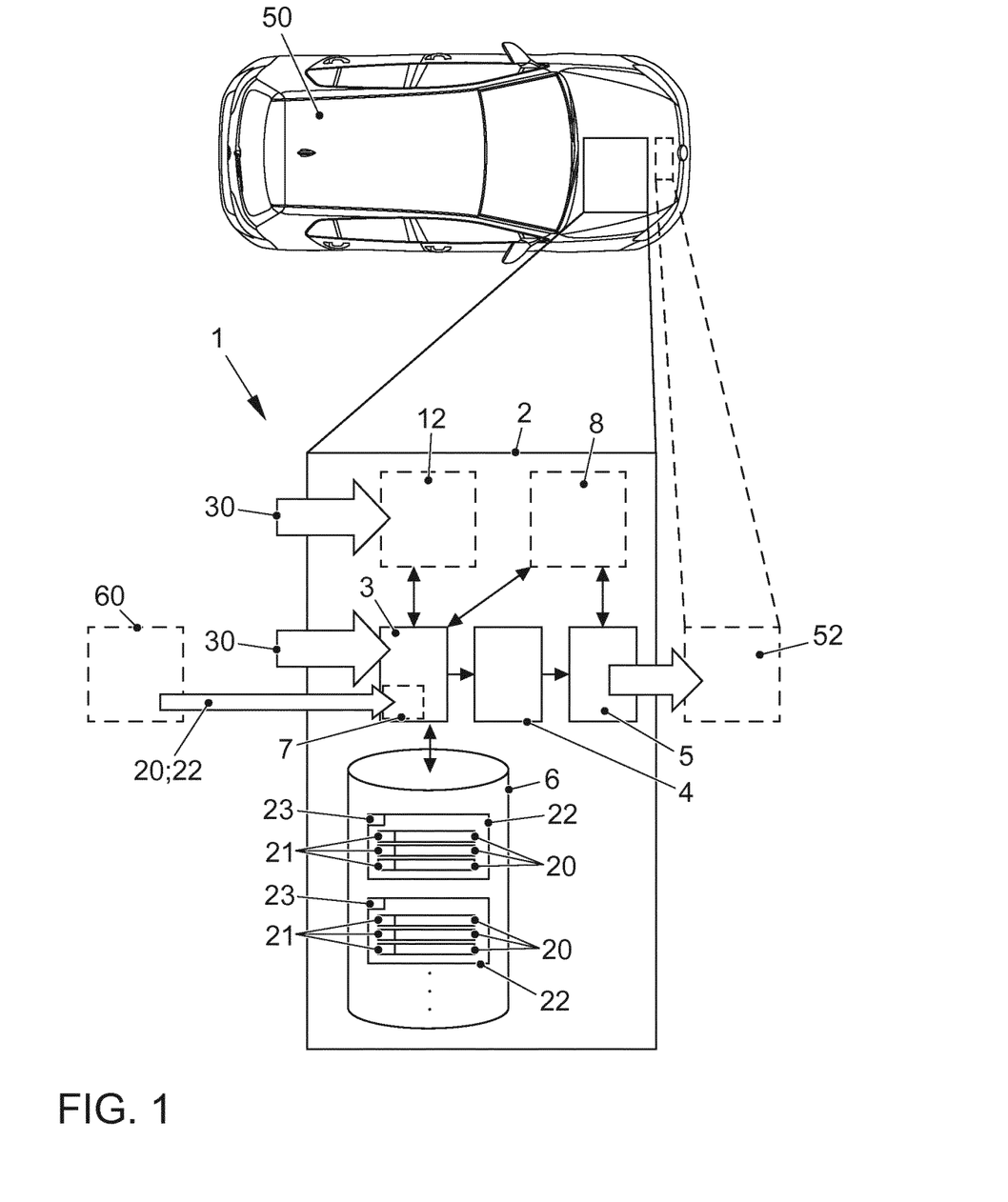
FIG. 1 shows a schematic representation of an embodiment of the device for the automated driving of a vehicle.

FIG. 1 shows a schematic representation of an embodiment of the device 1 for the automated driving of a vehicle 50. The device 1 comprises a control system 2. The control system 2 has a providing apparatus 3, a selecting apparatus 4, and a regulating apparatus 5.

The providing apparatus 3 provides function modules 20, wherein the function modules 20 each comprise at least one subfunction for automated driving. The function modules 20 are each assigned at least one module validity attribute 21. The module validity attribute 21 defines the context of the surroundings in which the particular function module 20 is valid, i.e., in particular the surroundings, or respectively the context of the surroundings, in which the particular function module 20 can be used or may be used. The function modules 20 are for example saved in the form of a database in a memory 6.

The providing apparatus 3 furthermore provides system configurations 22, wherein the system configurations 22 each comprise at least one of the function modules 20. The system configurations 22 are each assigned at least one configuration validity attribute 23. The at least one configuration validity attribute 23 defines the context of the surroundings in which the particular system configuration 22 is valid. The system configurations 22 are for example also saved in the form of a database in the memory 6.

The selecting apparatus 4 selects one of the at least one system configurations 22, wherein the selection depends on a context of the surroundings 30 and the at least one assigned configuration validity attribute 23.

In this regard, the selecting apparatus 4 can for example evaluate the detected or provided surroundings data corresponding with the context of the surroundings 30 and compare them with the particular validities expressed in the configuration validity attributes 23. A system configuration 22 is then selected that is valid for the surroundings, or respectively the context of the surroundings 30. If the configuration validity attributes 23 express for example that the associated system configuration 22 is valid for highway driving, and if the vehicle 50 is on a highway, said system configuration 22 is selected, and the vehicle 50 is controlled, or respectively regulated based on said selected system configuration 22.

In particular, the selecting apparatus 4 transfers the selected system configuration 22 to the regulating apparatus 5 which can access a detection of surroundings, an object recognition, and a transverse and longitudinal guidance actuator system 52 of the vehicle 50. The regulating apparatus 5 is then configured corresponding to the transferred system configuration 22, i.e., the function modules 20 contained in the selected system configuration 22 are used, or respectively logically generated. For example, by means of its assigned function modules 20, a selected system configuration 22 can provide that a camera and a radar should be used for detecting surroundings, an object recognition of signs and preceding vehicles, congestion monitoring through Car2X communication, and transverse and longitudinal guidance are to take place. Another system configuration 22 that is intended for use for parking contrastingly provides for example the use of an ultrasonic sensor for detecting the surroundings and not for congestion monitoring, etc.

It can be provided that the control system 2 additionally comprises a configuration apparatus 12, wherein the configuration apparatus 12 is designed to compile a system configuration 22 by selecting at least one of the function modules 20 provided by the providing apparatus 3. The selection in this case depends on a context of the surroundings 30 and each of the assigned module validity attributes 21 of the function modules 20. The context of the surroundings 30 can in this case be a current context of the surroundings, i.e., current surroundings, or also a future context of the surroundings 30 that is only considered to plan a system configuration 22 for a future point in time. In particular, the configuration apparatus 12 can compile system configurations 22 for all contexts of the surroundings 30 to be encountered for automated driving. The system configurations 22 compiled by the configuration apparatus 12 are archived in the memory 6 and transferred for example to the providing apparatus 3 for this purpose.

In addition, to provide the function modules 20, it can be provided that the providing apparatus 3 is furthermore designed to request at least one function module 20 from a vehicle-external database 60 and/or receive it therefrom. For this purpose, the providing apparatus 3 can have a communication interface 7 in order to be able to communicate with the vehicle-external database 60.

Moreover to provide the at least one system configuration 22, it can additionally be provided that the providing apparatus 3 is furthermore designed to request at least one system configuration 22 from a vehicle-external database 60, and/or receive it therefrom. This can also be accomplished through the communication interface 7.

The vehicle-external database 60 can for example be provided by a manufacturer of the vehicle 50, a country, a city, a municipality, a startup or any other company.

In particular, it can be provided that the control system 2 comprises a planning apparatus 8. To perform automated driving of the vehicle 50, the planning apparatus 8 compiles a configuration plan 24 (see FIG. 2) for said driving. This is done by selecting provided system configurations 22 depending on the contexts of the surroundings 30 of automated driving and each of the configuration validity attributes 23 assigned to the system configurations 22. In particular, it can be provided that several system configurations 22 are also selected for points in time, or respectively time ranges, for example in order to take into account potentially changing contexts of the surroundings, i.e., conditions of the surroundings, in the future. Accordingly, different function modules 20 can be provided for object recognition in an otherwise equivalent system configuration 22 depending on whether it is raining or dry. Correspondingly, it can be provided that the configuration plan 24 comprises two system configurations 22, one for a context of the surroundings with rain and one without rain.

The regulating apparatus 5 of the control system 2 then controls the vehicle 50 based on the compiled configuration plan 24. For this purpose, the system configurations 22 contained in the configuration plan 24 are sequentially activated, or respectively deactivated depending on the current context of the surroundings 30 so that the corresponding system configuration 22 is activated for each context of the surroundings 30 during automated driving, i.e., for each surroundings, and the control system 2, or respectively the regulating apparatus 5, can optimally control the vehicle 50, or respectively regulate longitudinal and transverse guidance.

Figure 2:
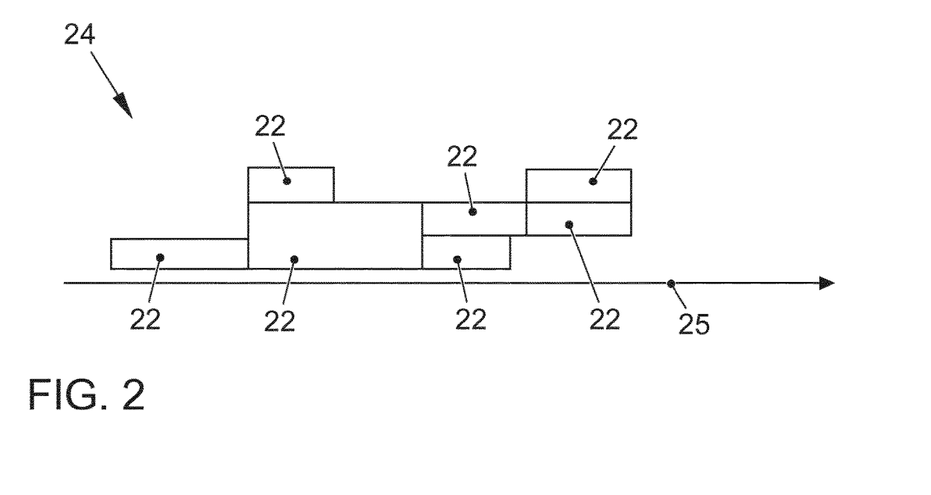
FIG. 2 shows an example of a configuration plan.

An example of a configuration plan 24 is for example shown in FIG. 2 in a time progression over a time axis 25. Over the course of automated driving, the corresponding system configurations 22 are activated sequentially, and in particular, the control system, or respectively regulating apparatuses 5 (see FIG. 1) are correspondingly configured.

Figure 3:
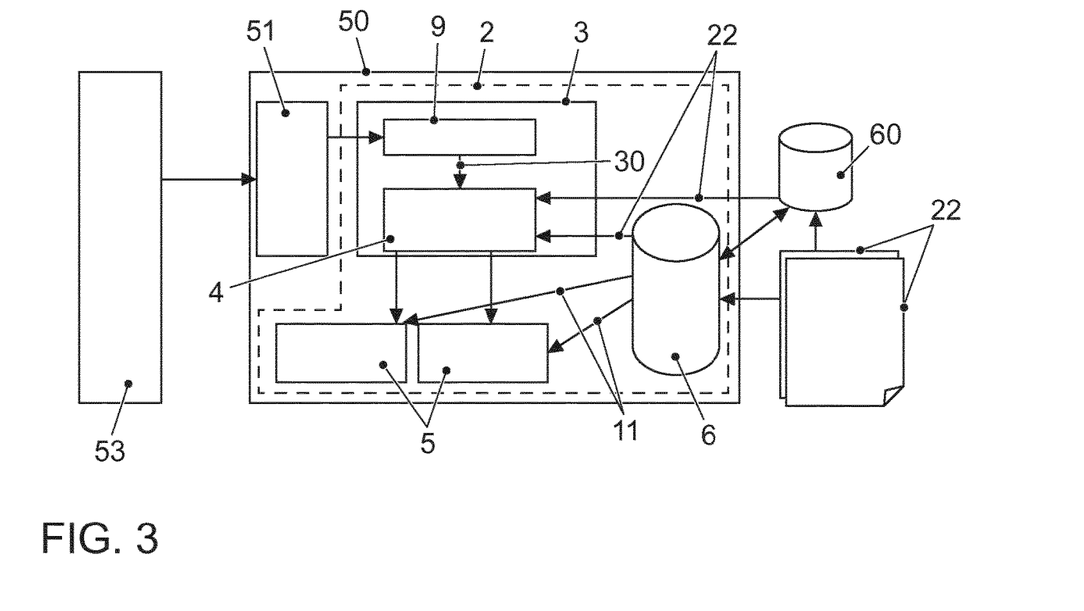
FIG. 3 shows a schematic representation of another embodiment of the device for the automated driving of a vehicle.

FIG. 3 shows a schematic representation of another embodiment of the device 1 for the automated driving of a vehicle 50, wherein in this representation, in particular a flow of information is schematically depicted.

The device 1 comprises a control system 2. The control system 2 comprises a providing apparatus 3 and regulating apparatuses 5 for regulating transverse and longitudinal guidance of the vehicle 50, as well as a memory 6. The providing apparatus 3 comprises a surroundings detection apparatus 9 and a selecting apparatus 4.

The surroundings detection apparatus 9 uses a vehicle sensor system 51 for detecting surroundings 53 of the vehicle 50. The surroundings detection apparatus 9 derives a context of the surroundings 30 from the detected surroundings data, and transmits it to the selecting apparatus 4. Said selecting apparatus requests a system configuration 22 in the database within the memory 6 that fits the context of the surroundings 30, or respectively current surroundings 53 to be transmitted. In particular, this is done by searching, or respectively filtering according to the configuration validity attributes belonging to the system configurations 22. In doing so, the system configuration 22 saved in the database is selected which is valid for the current context of the surroundings 30. Based on the requested system configuration 22, the control system 2 is configured by using the function modules that are assigned to the selected system configuration 22. The regulating apparatuses 5 are configured in particular. To accomplish this, the corresponding parameters 11 are transferred from the database to the regulating apparatuses 5.

It can be provided for a system configuration 22 to be requested from a vehicle-external database 60 based on the current context of the surroundings 30, for example a database provided by a manufacturer, a supplier, another company, a country, a city, a region, a municipality, or any other organization. It can furthermore be provided for the database saved in the memory 6 and the vehicle-external database 60 to be synchronized with each other.

If the regulating apparatuses 5 are configured corresponding to the selected system configuration 22, the vehicle 50 is controlled by them, i.e., longitudinal and transverse guidance is regulated by them.

The control system 2 continuously checks whether the selected system configuration 22 still corresponds to the current context of the surroundings 30, i.e., the current surroundings 53. If there is a change, a different system configuration 22 is selected, and the regulating apparatuses 5 are correspondingly configured differently.

When configuring based on the selected system configuration 22, it can be provided that the vehicle sensor system 51 is also configured, for example in that a sensor is selected, a detection area is defined, and/or parameters to be used when detecting are set.

Figure 4:
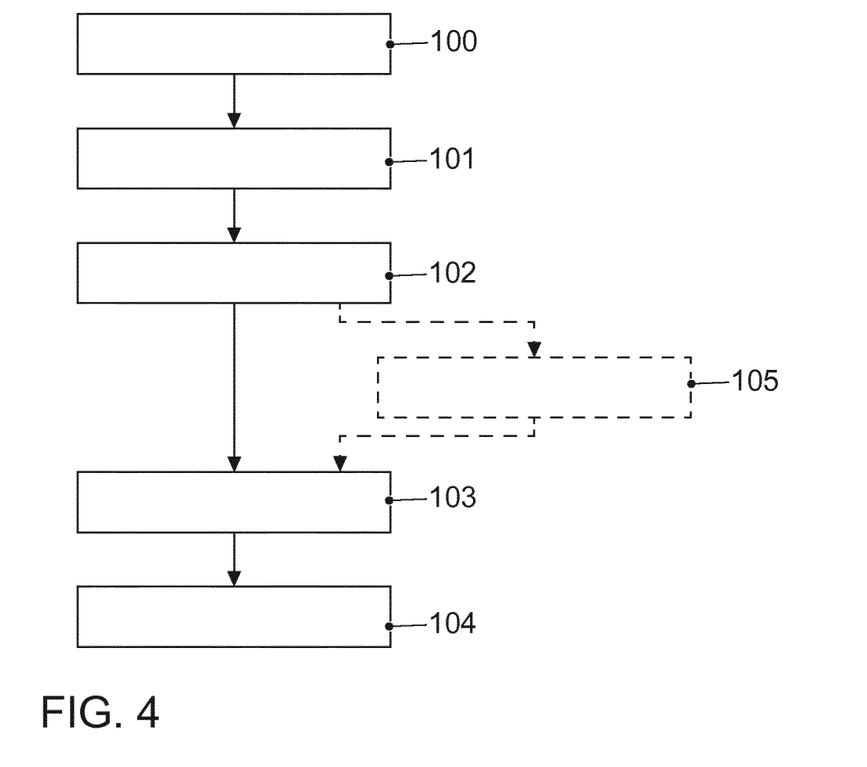
FIG. 4 shows a schematic flowchart of an embodiment of the method for the automated driving of a vehicle.

FIG. 4 shows a schematic flowchart of the method for the automated driving of a vehicle. In one method step 100, surroundings of the vehicle are detected, and a context of the surroundings is derived therefrom.

In method step 101, function modules are provided, in particular from a providing apparatus, wherein the function modules each comprise at least one subfunction for automated driving, and wherein the function modules are each assigned at least one module validity attribute that defines the context of the surroundings in which the particular function module is valid.

At least one system configuration is provided in method step 102, wherein the at least one system configuration comprises at least one of the function modules. The at least one system configuration is assigned at least one configuration validity attribute that defines the context of the surroundings in which the at least one system configuration is valid.

In method step 103, one of the provided system configurations is selected, in particular by means of a selecting apparatus, wherein the system configuration is selected in this case depending on the derived context of the surroundings and the at least one assigned configuration validity attribute. In particular, the system configuration is selected whose configuration validity attribute fits the derived context of the surroundings.

In method step 104, the vehicle is automatically controlled, wherein the controlling is based on the selected system configuration. To accomplish this, in particular a control signal is generated and provided to control longitudinal and transverse guidance of the vehicle.

To provide the at least one system configuration in method step 102, it can be provided that at least one of the provided function modules can be selected and assigned to this system configuration, wherein the selection depends on a context of the surroundings and each of the assigned module validity attributes of the function modules.

Furthermore, to provide the function modules in method step 101, it can be provided that at least one function module can be requested from a vehicle-external database, and/or is or was received therefrom.

It can furthermore be provided that, to provide the at least one system configuration in method step 102, at least one system configuration is requested from a vehicle-external database, and/or is or was received therefrom.

It can moreover be provided that, to perform automated driving of the vehicle, a configuration plan is compiled for said driving in another method step 105, wherein the configuration plan is realized by selecting provided system configurations depending on contexts of the surroundings of automated driving and the configuration validity attributes assigned to each of the system configurations. This method step 105 is performed before method step 103 so that the selection in method step 103 is in particular based on the system configurations in the compiled configuration plan.

LIST OF REFERENCE NUMERALS

1 Device
2 Control system
3 Providing apparatus
4 Selecting apparatus
5 Regulating apparatus
6 Memory
7 Communication interface
8 Planning apparatus
9 Surroundings detection apparatus
11 Parameter
12 Configuration apparatus
20 Function module
21 Module validity attribute
22 System configuration
23 Configuration validity attribute
24 Configuration plan
25 Time axis
30 Context of the surroundings
50 Vehicle
51 Vehicle sensor system
52 Transverse and longitudinal guidance actuator system
53 Environment
60 Vehicle-external database
100-105 Method steps The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for the automated driving of a vehicle, comprising in a control system:
providing functions, wherein the functions each comprise instructions for execution by a processor or digital logic, the instructions providing at least one subfunction for automated driving;
storing in memory, for each particular function, at least one function-level validity attribute that defines a context of surroundings of the vehicle in which the particular function is valid;
generating a plurality of system configurations, each system configuration comprises a subset of the functions, and
determining, for each respective system configuration, at least one configuration-level validity attribute as a function of the at least one function-level validity attribute of each function in the subset of functions in the respective system configuration, wherein the at least one configuration-level validity attribute defines a context of surroundings of the vehicle in which the respective system configuration is valid;
storing in memory the plurality of system configurations and the at least one configuration-level validity attribute determined for each system configuration;
before a driving session along a particular driving route, generating a configuration plan for the particular driving route by pre-selecting respective system configurations from the plurality of system configurations for each of a sequential series of times or sections of the particular driving route, based on contexts of the surroundings expected for the respective times or sections of the particular driving route, wherein multiple system configurations are pre-selected for a particular time or section of the particular driving route;
during the driving session along a particular driving route, selecting a particular one of the multiple pre-selected system configurations to implement for the particular time or section of the particular driving route based on a currently detected context of surroundings of the vehicle and the at least one assigned configuration-level validity attribute associated with each of the multiple system configurations; and
controlling the vehicle, wherein controlling is based on the selected system configurations.

2. The method of claim 1, further comprising, to provide the functions, one or more of requesting and receiving at least one function from a vehicle-external database.

3. The method of claim 1, further comprising, to generate the plurality of system configurations, one or more of requesting and receiving at least one system configuration from a vehicle-external database.

4. A device for the automated driving of a vehicle, comprising:
a control system;
wherein the control system is configured to:
provide functions, wherein the functions each comprise instructions for execution by a processor or digital logic, the instructions providing at least one subfunction for automated driving;
store in memory, for each particular function, at least one function-level validity attribute that defines a context of surroundings in which the particular function is valid;
generating a plurality of system configurations, each system configuration comprises a subset of the functions, and
determine, for each respective system configuration, at least one configuration-level validity attribute as a function of the at least one function-level validity attribute of each function in the subset of functions in the respective system configuration, wherein the at least one configuration-level validity attribute defines a context of the surroundings in which the respective system configuration is valid,
store in memory the plurality of system configurations and the at least one configuration-level validity attribute determined for each system configuration,
before a driving session along a particular driving route, generate a configuration plan for the particular driving route by pre-selecting respective system configurations from the plurality of system configurations for each of a sequential series of times or sections of the particular driving route, based on contexts of the surroundings expected for the respective times or sections of the particular driving route, wherein multiple system configurations are pre-selected for a particular time or section of the particular driving route;

during the driving session along the particular driving route, select a particular one of the multiple preselected system configurations to implement for the particular time or section of the particular driving route based on a currently detected context of surroundings of the vehicle and the at least one assigned configuration-level validity attribute associated with each of the multiple system configurations; and automatically control the vehicle based on the selected system configurations.

5. The device of claim 4, wherein the control system is configured to generate the plurality of system configurations by selecting at least one of the provided functions, wherein the selection depends on the context of surroundings and each of the assigned function-level validity attributes of the functions.

6. The device of claim 4, wherein to provide the functions, the control system is furthermore configured to request at least one function from a vehicle-external database, and/or receive it therefrom.

7. The device of claim 4, wherein to generate the plurality of system configurations, the control system is furthermore configured to request at least one system configuration from a vehicle-external database, and/or receive it therefrom.

8. The method of claim 2, further comprising, to generate the plurality of system configurations, one or more of requesting and receiving at least one system configuration from the vehicle-external database.

9. The device of claim 5, wherein to provide the functions, the control system is furthermore configured to request at least one function from a vehicle-external database, and/or receive it therefrom.

10. The device of claim 5, wherein to generate the plurality of system configurations, the control system is furthermore configured to request at least one system configuration from a vehicle-external database, and/or receive it therefrom.

11. The device of claim 6, wherein to generate the plurality of system configurations, the control system is furthermore configured to request at least one system configuration from the vehicle-external database, and/or receive it therefrom.

12. The method of claim 1, further comprising:

during the driving session, selectively activating and deactivating different ones of the multiple different system configurations specified in the configuration plan; and during the driving session, prior to the particular point of the driving session:

determining an actual context of surroundings of the vehicle;

determining a configuration-level validity attribute corresponding with the determined actual context of surroundings of the vehicle for each of the at least two different system configurations specified in the configuration plan for the particular point of the driving session; and selecting one of the at least two different system configurations to implement based on the determined configuration-level validity attributes corresponding with the determined actual context of surroundings of the vehicle for the at least two different system configurations.

* * * * *